United States Patent [19]

Schuwerk

[11] 4,435,971

[45] Mar. 13, 1984

[54] CONTROLLED DEFLECTION ROLL WITH CONTROL ARRANGEMENT

[75] Inventor: Wolfgang Schuwerk, Kisslegg, Fed. Rep. of Germany

[73] Assignee: Escher Wyss Aktiengesellschaft, Zurich, Switzerland

[21] Appl. No.: 334,644

[22] Filed: Dec. 28, 1981

[30] Foreign Application Priority Data

Jan. 15, 1981 [DE] Fed. Rep. of Germany ....... 3101115

[51] Int. Cl.³ ............................................ B21B 29/00
[52] U.S. Cl. .................................. 72/243; 29/113 AD
[58] Field of Search .................... 72/241, 243, 245, 16; 29/113 AD, 116 AD; 73/37.7

[56] References Cited

U.S. PATENT DOCUMENTS

| | | | |
|---|---|---|---|
| 4,106,405 | 10/1978 | Biondem et al. | 72/243 |
| 4,167,964 | 9/1979 | Flury | 72/241 |
| 4,212,504 | 7/1980 | Krylou et al. | 72/241 |

*Primary Examiner*—Lowell A. Larson
*Assistant Examiner*—Jorji M. Griffin
*Attorney, Agent, or Firm*—Werner W. Kleeman

[57] ABSTRACT

A controlled deflection roll equipped with a control arrangement, wherein at the controlled deflection roll there is carried out a groupwise control of the support elements in a manner such that each commonly controlled group of support elements contains at least one support element which does not neighbor any one of the other of the support elements of such group which are effective in the same direction, or such one support element is operatively correlated with at least one support element of the group which is effective in an opposite direction. In the latter case where support elements of the common group are effective in opposite directions they may however neighbor one another in the axial extent of the controlled deflection roll. In this way deviations of the mean or average value of the product profile or sectional shape of the rolled product can be reduced, without the expenditure in the number or construction of the support elements or their controls having to be increased.

3 Claims, 5 Drawing Figures

Fig. 3
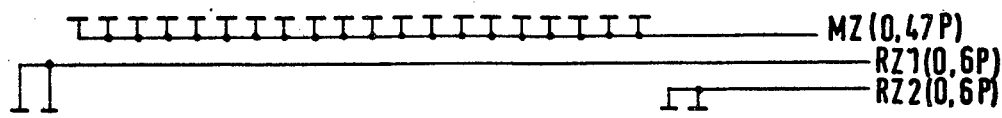
Fig. 4
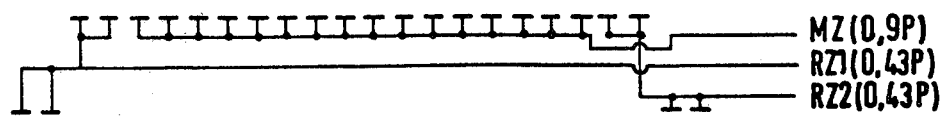
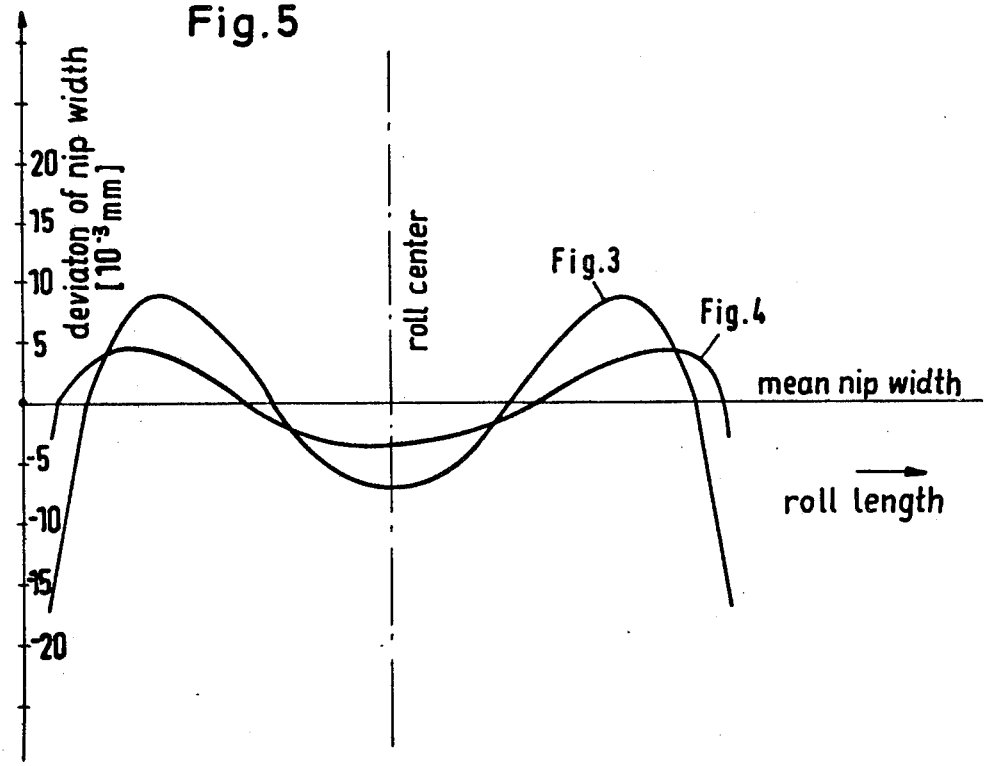

CONTROLLED DEFLECTION ROLL WITH CONTROL ARRANGEMENT

CROSS-REFERENCE TO RELATED APPLICATIONS

This application is related to my commonly assigned, copending United States application Ser. No. 06/334,643 filed Dec. 28, 1981, entitled: "Control Deflection Roll", and the commonly assigned, copending United States application Ser. No. 06/334,642, filed Dec. 28, 1981, entitled "Apparatus for Controlling the Pressing Force between a Controlled Deflection Roll and a Counter Element" of the inventor Ignazio Marchioro.

BACKGROUND OF THE INVENTION

The present invention relates to a new and improved construction of a controlled deflection roll containing a control arrangement or control means.

Generally speaking, the controlled deflection roll equipped with a control means as contemplated by the present development is of the type comprising a roll shell which is supported by support elements upon a roll support in one or a number of effective directional planes. The support elements are distributively arranged in the direction of the lengthwise axis of the roll and can be controlled in order to influence the thereby applied support or supporting force. Also, a control arrangement is provided for adjusting the support force of the support elements, the control arrangement generating for each group of support elements a common control signal.

Controlled deflection rolls of the aforementioned type have been known to the art from, for instance, German Pat. No. 2,847,029. With the prior art controlled deflection roll there are provided a plurality of zones over the roll length, these zones in each case being supported by a group of commonly control support elements. In this way it is possible to individually alter within the separate zones the pressing force with respect to the counter element, in other words to control the roll nip or gap width.

The behaviour of such zone-controlled roll has been theoretically examined in the publication entitled "Das Papier", Volume 4, Page 125 et seq., 1980, and specifically for a three-zone roll which however is not used in actual practice. The author of such publication explains the causes for the deviations of the roll gap or nip width from a predetermined mean or average value which arise in practice; the roll profile retains its shape even in the presence of a deviating setting of the mean line force, whereas the magnitude of the deviations however vary. The aforementioned profile shape possesses in characteristic fashion so-called "null crossovers" of the gap width deviation, so that the profile assumes the known M-shape or W-shape, and there are present four null crossovers or throughpasses.

If there are increased the number of adjacently situated controlled zones, it is correspondingly possible to also increase the number of null crossovers, and there is associated therewith a reduction in the gap width deviation from the set mean or average value. However, it should be understood that an increase in the number of individually controllable zones also enlarges the structural expenditure in the equipment, since for each group of commonly control support elements there must be provided a related separate adjustment element; in the case of an adjustable roll containing hydrostatic support bearings or support elements such is constituted by a pressure control valve having its own infeed line. These infeed lines are accommodated at the roll support, which when increasing the number of infeed lines also can result in spatial problems in the design of the controlled deflection roll.

SUMMARY OF THE INVENTION

Therefore, with the foregoing in mind it is a primary object of the present invention to provide a new and improved construction of controlled deflection roll which is not afflicted with the aforementioned drawbacks and limitations of the prior art constructions.

Another and more specific object of the present invention aims at providing a new and improved construction of a controlled deflection roll and control arrangement wherein with the same number of commonly controlled support element groups there can be nonetheless improved the product profile or sectional shape, i.e. the product profile is rendered more even or uniform.

Now in order to implement these and still further objects of the invention, which will become more readily apparent as the description proceeds, the controlled deflection roll of the present development is manifested by the features that, according to one preferred construction of the invention, at least one common controlled group of support elements contains non-neighbouring support elements. Stated in another way, in the case of such group of support elements which are all effective in the same direction at least one of them does not neighbour any other ones of the support elements of such group.

Accordingly, for at least one group of support elements there is deviated from the principle that always neighbouring support elements of the group are commonly controlled. Quite to the contrary, there is carried out an operative correlation of the individual support elements of a common controlled group in such a manner that there arise slight roll nip width deviations, and the optimum result can be mathematically or empirically determined.

The expression "neighbouring" as used in the above-disclosure relates to an arrangement of support elements which are effective in the roll nip direction. If, as in the arrangement disclosed in German Patent Publication No. 2,325,721, there are provided apart from the support elements additional counter support elements, the force direction of which is opposite to that of the first mentioned support elements, then there exists, for instance, the possibility of grouping together into a common group one or two counter support elements located at the edge or marginal region of the roll and one or two directly following "neighbouring" support elements which in fact do really neighbour one another in the axial direction of the roll and to act upon such common group of support elements with the same control signal. Since, however, in this case there is not present the same effective or pressing direction for all of the support elements of this group such support elements are therefore likewise to still be considered "non-neighbouring" in the sense that this term is used in the foregoing disclosure and the claims.

In both of the above-explained situations, that is where the support elements of a common group are effective in the same direction or the support elements of a common group are effective in opposite directions, it may be generically stated that the invention can be construed as having at least one common controlled group of support elements which contains at least one support element which otherwise, meaning in the case of a conventional controlled deflection roll as heretofore known in the art, would belong to a different group of commonly controlled support elements. Stated in another way, with the invention the commonly controlled group of support elements contains at least one support element which in the case of a standard prior art roll would otherwise have belonged to a different group of commonly controlled support elements.

Also the expression "support element" requires some explanation. It is uncritical for the invention whether such support element comprises a hydrostatic support bearing, as disclosed in the aforementioned patents, or if, for instance, there . are used electromagnetic or mechanical force-applying sources. Equally, it is conceivable to employ the invention in the environment of controlled deflection rolls wherein a sector of the roll shell is subjected to the pressure of a pressurized fluid medium over its whole length or only part of its length and if there are provided over the length of the roll support or beam distributively arranged controllable pressure reduction elements, in other words actual "force sinks". Also such force sinks can be grouped together according to the invention into commonly controlled groups.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 schematically illustrates, comparable to the showing of FIG. 2, the group correlation according to the state of the art with an imaginary roll arrangement;

FIG. 4 illustrates the group correlation corresponding to the invention for the corresponding roll configuration similar to the showing of FIG. 3; and FIG. 5 graphically illustrates the product profiles or sectional shapes which can be realized with the control according to FIGS. 3 and 4, respectively.

DETAILED DESCRIPTION OF THE PREFERRED EMBODIMENTS

Figure 1:
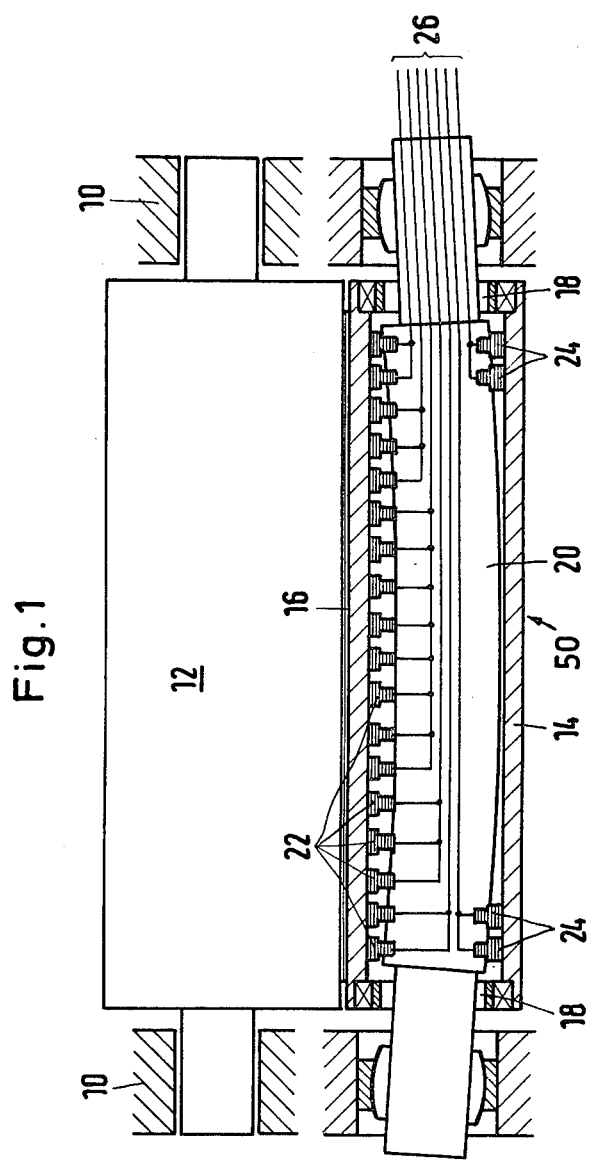
FIG. 1 schematically illustrates a roll arrangement containing a control arrangement according to the state of the art.

Describing now the drawings, the roll system depicted in FIG. 1 will be seen to comprise a substantially cylindrical counter roll 12 mounted in bearings 10 at its opposed ends or end regions. The counter roll 12 forms in conjunction with a roll shell 14 of a controlled deflection roll 50 a roll gap or nip 16. The roll shell 14 is guided to be freely vertically movable by means of appropriate guides 18 or equivalent structure and bears upon a stationary roll support or beam 20 by means of the support elements 22 as is well known in this art. Near to the ends or end regions of the roll shell 14 there are provided in addition to the support elements 22 the counter support elements 24. The roll system has been depicted in a position wherein the support sources/counter support sources, meaning the support elements 22 and the counter support elements 24, are just capable of applying the forces needed for the compensation of the inherent weight of the roll shell 14 and the counter roll 12, i.e. the counter roll 12 and the roll shell 14 do not experience any appreciable deformation.

In the embodiment under discussion the support elements 22 are constructed as hydrostatic support bearings which develop a supporting force proportional to the pressure of the infed hydraulic fluid medium. This hydraulic fluid medium which is delivered at an adjustable pressure is infed to the support elements 22 and the counter support elements 24 by means of infeed lines 26 which only have been here schematically indicated.

As to the eighteen support elements 22, which have been shown by way of example and not limitation, both of the outermost ones of these support elements at both ends or end regions of the roll 50 are grouped together into a respective common controlled group at the so-called marginal or end-zone and such outermost grouped together support elements are impinged with the same fluid medium pressure. The next following three respective support elements located to each side of the respective two outermost support elements at the marginal zone form commonly controlled intermediate zones, and the eight centrally located support elements form a central zone. Finally, each pair of neighbouring counter support elements 22 are combined into a respective group.

Figure 2:
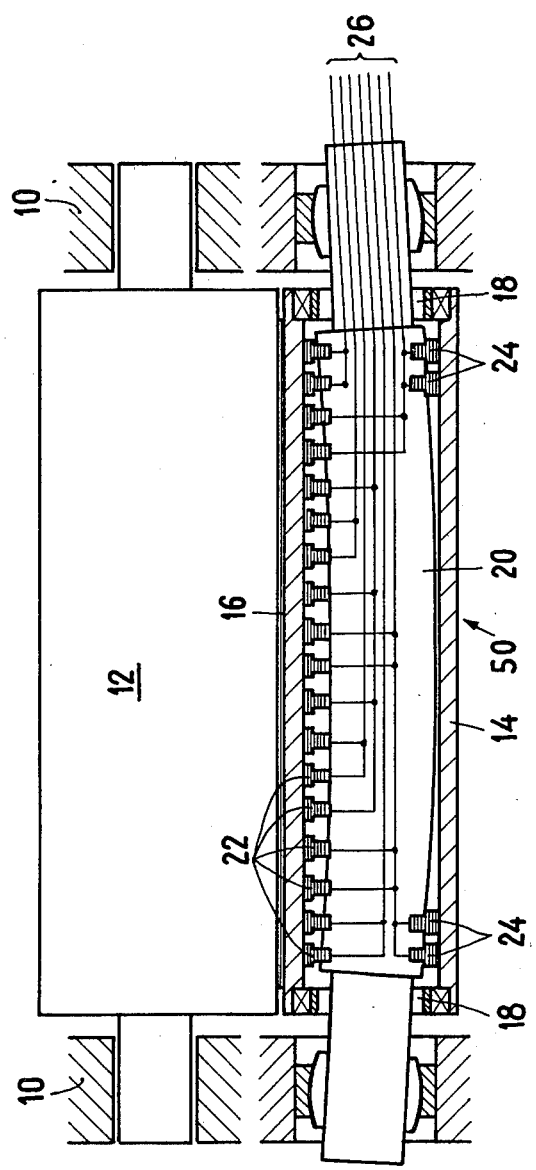
FIG. 2 schematically illustrates the correlation of the individual support elements to the momentarily commonly controlled groups for the same roll arrangement however modified in accordance with the invention.

The operative correlation of the support sources, meaning the support elements 22, and the counter support sources, meaning the counter support elements 24, into the common controlled groups according to the proposals of the invention has been illustrated in analogous fashion in FIG. 2. There will be recognised that the same number of control units or devices are employed, namely a total of seven such control units, however several groups now also encompass "non-neighbouring" support sources or elements 22 and counter support sources or elements 24, respectively. It should be understood that there must be carried out a new computation of the momentarily required pressures and control functions in dependency upon the line force characteristic or course, and this can be easily performed by those skilled in the art based upon known computation techniques.

It will be recognised that with this exemplary embodiment of the invention the individual control of the individual groups of support elements can be carried out by the machine operator in the manner as was heretofore the case, but however there no longer results any decisive correlative effect at corresponding zones as concerns the width of the rolled material. This field of application is predominantly meant to be considered in those instances wherein there is not required any such "correction potential".

However, the teachings of the invention also can be advantageously employed even if there is maintained the zone influencing action. In this case the utilization of the new correlation to the common control is limited in each instance to support sources and counter support sources located in a wide zone. This will be explained more fully in conjunction with an extremely simple example.

FIG. 3 only illustrates the support sources which are represented schematically by the substantially T-shaped symbols and the inverted or inversed T-shaped symbols represent schematically the counter support sources of a controlled deflection roll containing three zones, wherein in both marginal or end regions two respective counter support sources are grouped together into first and third zones, whereas eighteen support sources define the common controlled center zone. This has been symbolized by the pressure infeed lines RZ1 MZ and RZ2. The pressures are indicated in fractions of a maximum pressure P, in order to obtain a predetermined mean line force and a predetermined roll gap width.

FIG. 4 illustrates an embodiment which is modified according to the invention in relation to the arrangement shown in FIG. 3. This arrangement according to the invention as illustrated in FIG. 3 requires the same equipment or structural expenditure, apart from the fact that in each case both of the outermost support sources at the end regions are grouped together with the counter support sources into a common marginal or end zone and are controlled either conjointly or in the manner that within a common controlled group at least one or more support elements differ as to their force effect by a constant or by a differential force which is proportional to the supporting force. The support sources which no longer neighbour one another in the sense of the heretofore given definition, namely, on the one hand, both of the counter support sources and both of the outermost support sources in both marginal or end zones are nevertheless connected to the common pressure infeed lines RZ1 and RZ2, respectively. In order to obtain the same pressing pressure or roll nip as for the arrangement of FIG. 3, the indicated pressures must be applied, which of course deviate from the data given in FIG. 3; it should be understood that in all other respects there are presupposed the presence of the same conditions.

FIG. 5 illustrates the product profile course for both embodiments of FIGS. 3 and 4, respectively. There will be recognized that the deviations from the mean product thickness, with the arrangement of FIG. 4, are appreciably less than with the arrangement of FIG. 3, and the inventive construction depicted in FIG. 4 is more favorable by a factor of about 2. It can be easily demonstrated that for other predetermined line pressures the improvement is maintained, in other words is not limited to a certain line force or a limited region thereof.

Furthermore, it is to be remarked that, as stated above, such type of three-zone rolls are not utilized in actual practice; this example has only been used for purposes of explanation. However, it can be easily demonstrated that also in the case of five-zone or multi-zone rolls already the regrouping at the marginal or end region renders possible an improvement in the product quality without any increased equipment expenditure and while maintaining the controllability of the zones.

While there are shown and described present preferred embodiments of the invention, it is to be distinctly understood that the invention is not limited thereto, but may be otherwise variously embodied and practiced withing the scope of the following claims. ACCORDINGLY,

What I claim is:

1. A controlled deflection roll intended to cooperate with a counter roll, comprising:

a roll shell having opposed end regions;

a roll support having opposed end regions;

a plurality of support elements interposed between said roll shell and said roll support for supporting said roll shell upon said roll support;

predetermined ones of said support elements being arranged in respective commonly controlled groups;

at least one of said commonly controlled groups of support elements containing at least two support elements effective in opposite directions;

said at least two support elements which are effective in opposite directions of said one commonly controlled group of support elements being arranged at one of the end regions of said roll support and said roll shell;

said at least two support elements which are effective in opposite directions being spaced from one another in order to exert a bending moment at said one end region of said roll shell in order to counteract edge compression between the controlled deflection roll and the counter roll;

one of said at least two oppositely effective support elements being located closer to an outer edge of said one end region of the roll shell than the other support element; and a common supply line for applying essentially the same pressure force to said at least two support elements which are effective in opposite directions, so that the forces applied by said two support elements essentially compensate one another, but by virtue of the different mutual spacing of said two oppositely effective support elements from said outer end of the roll shell there is applied a bending moment to the roll shell counteracting edge compression.

2. The controlled deflection roll as defined in claim 1, further including:

a solid counter roll cooperating with said controlled deflection roll.

3. The controlled deflection roll as defined in claim 1, further including:

a further group of said at least two oppositely effective support elements arranged at the opposite end region of said roll shell remote from said one end region thereof; and a further common supply line for said further group of said at least two oppositely effective support elements.

* * * * *